United States Patent
Hanson-Abbott et al.

(10) Patent No.: US 6,885,295 B2
(45) Date of Patent: Apr. 26, 2005

(54) REVERSING ALARM

(75) Inventors: Christopher Hanson-Abbott, London (GB); Masato Yamashita, Kanagawa-ken (JP)

(73) Assignees: Brigade Electronics Plc, London (GB); Yamaguchi Electric Ind. Co. Ltd., Tokyo (JP)

(*) Notice: Subject to any disclaimer, the term of this patent is extended or adjusted under 35 U.S.C. 154(b) by 216 days.

(21) Appl. No.: 10/103,319

(22) Filed: Mar. 19, 2002

(65) Prior Publication Data

US 2002/0101338 A1 Aug. 1, 2002

Related U.S. Application Data

(63) Continuation of application No. PCT/GB01/01196, filed on Mar. 19, 2001.

(30) Foreign Application Priority Data

Mar. 28, 2000 (GB) .............................................. 0007506

(51) Int. Cl.[7] .................................................. B60Q 1/26
(52) U.S. Cl. ................... 340/474; 340/463; 340/384.72
(58) Field of Search ................................ 340/456, 463, 340/468, 471, 474, 384.72, 904

(56) References Cited

U.S. PATENT DOCUMENTS

| | | | |
|---|---|---|---|
| 3,905,016 A | * | 9/1975 | Peterson ..................... 340/463 |
| 3,943,507 A | | 3/1976 | Neal et al. |
| 4,030,088 A | * | 6/1977 | McCullough ................ 340/903 |
| 4,290,053 A | | 9/1981 | Nemoto |
| 4,994,800 A | * | 2/1991 | Milliken ...................... 340/901 |
| 5,105,394 A | | 4/1992 | Percy |
| 5,650,765 A | | 7/1997 | Park |
| 6,064,302 A | * | 5/2000 | Peterson et al. ............. 340/463 |

FOREIGN PATENT DOCUMENTS

| | | | | |
|---|---|---|---|---|
| CA | 2225002 | | 6/1998 | |
| GB | 2 040 092 A | | 8/1980 | |
| GB | 2 318 662 A | | 4/1998 | |
| GB | 2318662 A | * | 4/1998 | ............ G08B/3/10 |
| GB | 0007506.9 | | 5/2000 | |
| WO | PCT/GB 01/01196 | | 7/2001 | |

* cited by examiner

*Primary Examiner*—Jeffery Hofsass
*Assistant Examiner*—Jennifer Stone
(74) *Attorney, Agent, or Firm*—Cook, Alex, McFarron, Manzo, Cummings & Mehler, Ltd.

(57) ABSTRACT

A reversing alarm for a vehicle emits an audible signal in the form of pulses of broad band sound when the vehicle is put into reverse gear. The broad band sound allows persons in the vicinity to locate the vehicle, as the human brain is able to process broad band sound to pinpoint the location of the sound source in a way which is not possible with single tone sounds. The alarm is implemented via a simple electronic circuit which uses a zener diode as a signal generator 20 to generate the broad band sound.

15 Claims, 3 Drawing Sheets

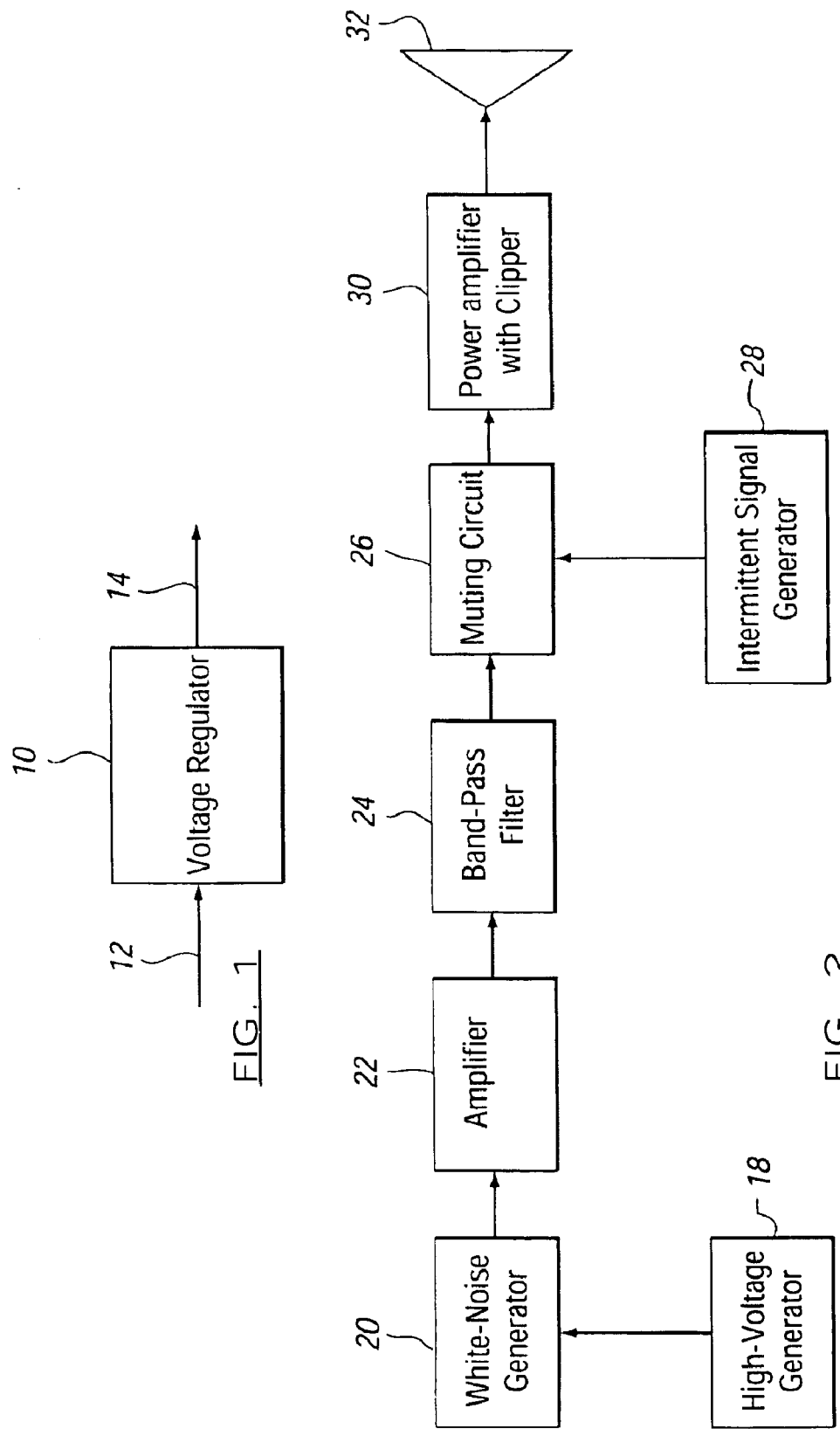

REVERSING ALARM

CROSS REFERENCE TO RELATED APPLICATION

This application is a continuation of PCT/GB01/01196 filed on Mar. 19, 2001, which is incorporated herein by reference.

The present invention relates to a reversing alarm for a vehicle.

BACKGROUND OF THE INVENTION (1) Field of the Invention

It is widely recognised that safety is greatly increased if a vehicle has some form of alarm fitted which operates to warn people when the vehicle is reversing. This applies to many types of vehicles, including cars, vans, lorries, and buses, and also light and heavy mobile plant such as tractors, fork-lift trucks, dozers and loaders.

Such alarms typically take the form of either a light and/or an audible sound which is operated when the vehicle is put into reverse gear. Ideally, the alarm is activated automatically by engaging reverse gear. Previously proposed alarms have combined both light and sound, so that the presence of a reversing vehicle is apparent even if the vehicle is out of sight or if a person is not looking at it, and it also can be detected by both visually impaired and aurally impaired people.

(2) Description of Related Art

Previously proposed sound alarms have used a single tone sound, which may be pulsed to produce a beeping effect, or may be swept through a predetermined frequency range in the manner of alarms on emergency vehicles. Whilst such an arrangement is effective in being recognised as an alarm, partly due to the common usage of such sounds for that purpose, alarms using this feature have disadvantages.

The human brain is very poor at being able to locate the source of a sound which consists of a single frequency or just a few frequencies. Therefore, known reversing alarms will alert a person to the fact that a vehicle nearby is reversing, but will provide little guidance as to the location of the vehicle. This is clearly a significant problem, given that the vehicle could be obscured from view, by, for example, a building, other traffic, or boxes in a warehouse, or allowing for the fact that the person may be visually impaired. Thus, the impetus for the person to take appropriate evasive action is not as great as is desirable.

It is an aim of the present invention to address the aforementioned disadvantage.

BRIEF SUMMARY OF THE INVENTION

Accordingly the present invention is directed to a reversing alarm for a vehicle which in use produces an audible signal comprising broad band sound (BBS). It is known that the human ear and brain can process BBS in such a way that the location of the noise can be determined, whereas this is not possible with a sound containing only one or a few frequencies. The general usefulness of BBS to facilitate sound source location has been disclosed in GB 2303235 and GB 2318662. The ability of a listener to locate the source of a warning sound emitted by a reversing vehicle vastly increases the usefulness of reversing safety alarms, as the location of the reversing vehicle is readily apparent even in circumstances where a clear view of the vehicle is unavailable.

A reversing alarm according to the present invention has further advantages. The sound dissipates faster, which gives an enormous reduction in noise nuisance and complaints. The threshold of audibility is around 5 db less than a previously proposed pure-tone reversing alarms, which permits the use of a reversing alarm 5 db lower than a previously proposed pure-tone reversing alarm. The sound pressure is greater for fewer decibels, giving greater audibility immediately behind the vehicle for lower noise nuisance.

Advantageously the alarm comprising a signal generating device to generate a broad band sound signal and bandwidth narrowing means for narrowing the bandwidth of the broad band sound signal before emission of the audible signal. The multi-frequency characteristics of BBS are required for the human ear to locate the source of the noise, but frequencies across the whole range of human hearing are not necessary for this. Therefore, some of the bandwidth can be lost without affecting the operation of the alarm. This is useful in that the remaining electronic components of the alarm do not require such a wide bandwidth-handling capability, so can be less costly. Advantageously, the bandwidth narrowing means comprises a band-pass filter.

Preferably, the audible BBS signal is emitted in pulsed bursts.

Advantageously, the alarm comprises a muting circuit, driven by an intermittent signal generator, which acts to alternately block and pass the BBS signal to produce pulsed bursts of sound. A pulsed sound is more easily distinguished from background noise than a continuous sound, so a listener will be more easily able to perceive that they are hearing an alarm. Preferably, the alarm further comprises a clipper circuit which compresses and reshapes the corners of the pulsed signal. This reshaping of the pulsed signal, which, as produced by the muting circuit, has sharply defined corners to the pulses, allows subsequent amplification of the signal to be more efficient.

Preferably the pulsed bursts of sound have a repetition frequency of substantially 1.5 Hz (90 pulses per minute).

Advantageously, the signal generating device comprises a zener diode. A zener diode is small and compact, and produces a good spectrum of BBS.

In a preferred embodiment the alarm is powered by a standard 12 V DC or 24 V DC vehicle battery. There is therefore no need for an dedicated power source to be provided for the alarm, as it can be connected to the existing battery in a vehicle.

Advantageously, the alarm comprises a voltage regulator which acts to regulate the voltage from the battery before the voltage is applied to power the reversing alarm. Preferably, the voltage regulator produces a voltage of substantially 8 V DC. The voltage regulator thereby protects the alarm from any fluctuations in power from the battery.

Preferably, the alarm comprises a speaker from which the BBS is emitted, and preferably, the speaker is waterproof. As the alarm is likely to be mounted on the exterior of a vehicle, it is important that the speaker is resilient enough to withstand the rigours of the environment.

In a preferred embodiment, the components of the alarm are mounted within a housing adapted for mounting on the exterior of a vehicle. This configuration provides a simple all-in-one unit which can be easily and quickly fitted to a vehicle.

Possibly, the alarm also comprises a light source which provides a visible signal when the alarm is in use. This provides an extra warning device, and also allows for the alarm to incorporate the function of an existing reversing light.

Advantageously, when the alarm is fitted to a vehicle, it is automatically activated when the vehicle is put into reverse. This means that the alarm is always used when required by the act of reversing, and does not depend for its operation on the driver of the vehicle remembering to switch it on.

BRIEF DESCRIPTION OF THE SEVERAL VIEWS OF THE DRAWINGS

An example of a reversing alarm for a vehicle made in accordance with the present invention will now be described with reference to the accompanying drawings, in which:

FIG. 1 shows a block diagram of a voltage regulator used to power an alarm according to the present invention;

FIG. 2 shows a block diagram of electronic components of an alarm according to the present invention;

DETAILED DESCRIPTION OF THE INVENTION

Figure 3:
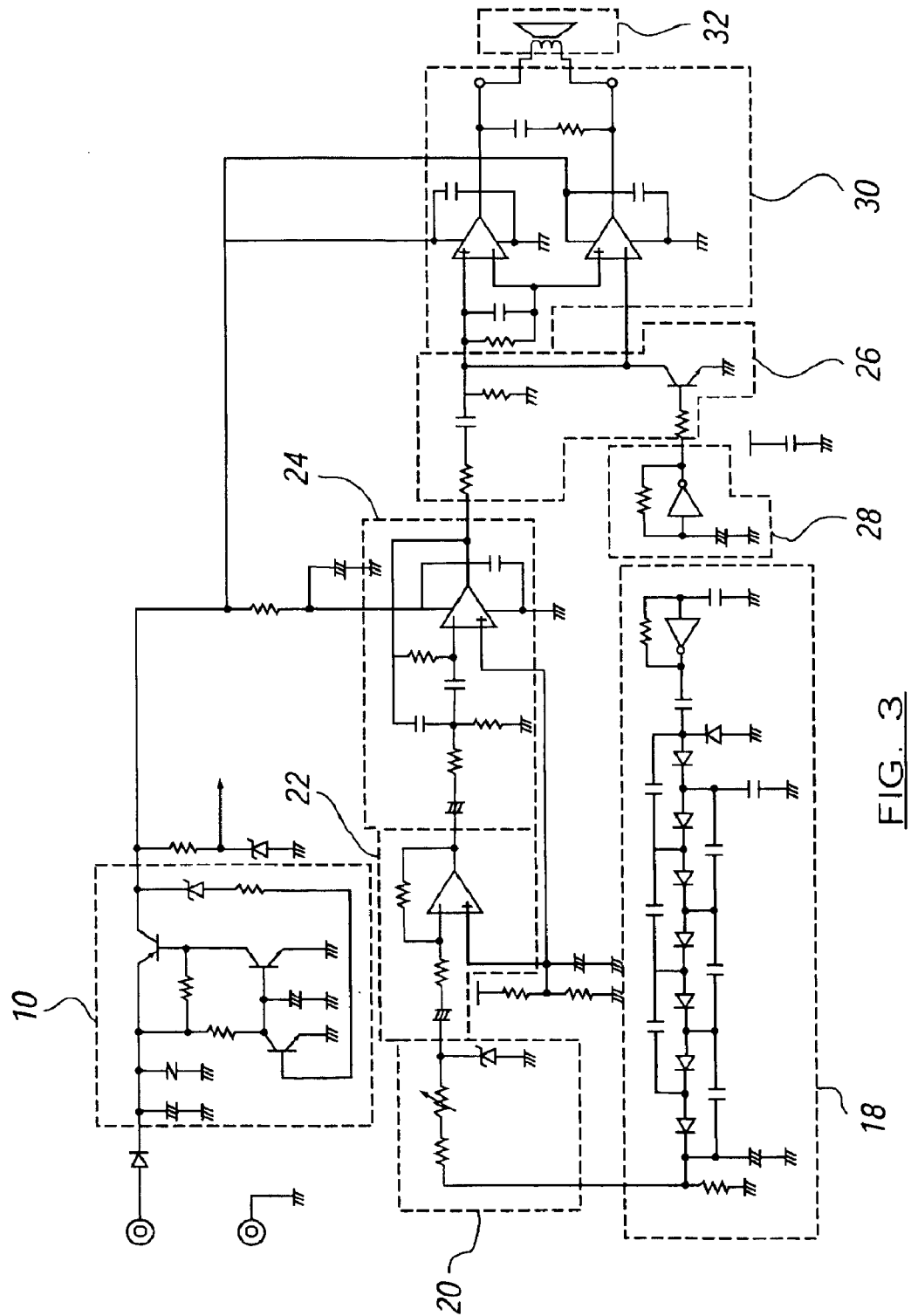
FIG. 3 is a circuit diagram of the electronic components shown in FIG. 2.

FIG. 1 shows a block diagram of a voltage regulator 10 having an input indicated at 12 and an output indicated at 14. The input voltage is taken from a standard vehicle battery producing nominally 12 V DC or possibly 24 V DC. The voltage regulator 10 accepts the input voltage, which can vary according to the condition of the battery between say 9 V DC and 28 V DC, and regulates and stabilises it to produce an output voltage of approximately 8 V DC. This output voltage is used to power the reversing alarm according to the present invention. Thus the alarm is powered by a vehicle's existing ordinary battery, and no additional power source is required.

FIG. 2 shows an embodiment of an alarm according to the present invention, in block diagram form. The blocks represent various components of an electronic circuit.

The circuit is powered by the 8 V DC supply derived from the voltage regulator 10, this voltage being feed to each block (connections not shown).

A high voltage generator 18 produces a voltage of 15 to 20 V DC. A signal generator 20 is powered by this voltage. The signal generator 20 produces a BBS signal. A zener diode is used to generate the signal. The BBS signal is then passed to an amplifier 22, and then to a band-pass filter 24.

A muting circuit 26, which is driven by an intermittent signal generator 28, receives the signal from the band-pass filter 24. The signal is then fed to a second amplifier 30 and a clipper circuit, before passing to a speaker 32, which emits the BBS signal as an audible sound.

The operation of the alarm is as follows:

When the alarm is activated, the circuit is switched on. The zener diode in the signal generator 20 produces a BBS signal. The 15 to 20 V DC provided by the high voltage generator 18 provides optimum performance of the zener diode so the BBS signal is maximised. The BBS signal is passed to the amplifier 22 where it is amplified to a level which can be readily processed by the remainder of the alarm circuit. In this way, more standard, non-specialist electronic components can be used, thus reducing the cost and complexity of the circuit.

The amplified BBS signal is then fed to the band-pass filter 24. The band-pass filter 24 acts so as to filter out the highest and lowest frequencies in the signal, i.e. it passes the central frequencies. In this way, the band width of the BBS signal is narrowed. The BBS signal produced by the zener diode has a very wide bandwidth, and contains frequencies which are not of use in an audible alarm as they are too high or too low to be readily heard by the average human ear. Therefore, these components can be filtered out without affecting the quality of the BBS. Also, the ability of a listener to locate a BBS source is not particularly adversely affected by a reduction in the BBS frequency bandwidth to something less than the bandwidth of human hearing. Therefore, further components can be filtered out from the signal without reducing the usefulness of the alarm. This narrowing of the bandwidth is advantageous in that the remaining components of the alarm circuit do not need to have such a high bandwidth-handling capability; the signal can be processed efficiently by lower performance components.

The intermittent signal generator 28 generates a signal which is passed to the muting circuit 26. The purpose of the muting circuit is to modulate the BBS signal so that intermittent bursts, or pulses, of BBS can be produced by the alarm. An intermittent, regular, pulsing sound is more useful for an alarm than a continuous sound, as a listener is more likely to perceive it the sound as an alarm, and will be more readily able to distinguish it from background noise.

The signal from the intermittent signal generator 28 has a cycle frequency of the order of 1.5 Hz. This signal drives the muting circuit 26 so that it acts as an alternating pass filter to alternately pass or block the incoming BBS signal. Thus the signal leaving the muting circuit comprises pulses or bursts with a repetition frequency of 1.5 Hz, in other words, 90 pulses per minute.

On leaving the muting circuit, the BBS signal is fed to the second amplifier 30. This amplifies the signal to a suitable level to enable the alarm to produce an audible signal of sufficient volume. The required volume of sound will depend on the environment in which the alarm is intended to be used (i.e. a noisy or a quiet environment), so an appropriate amplifier can be incorporated into the alarm circuit. The amplifier 30 further comprises a "clipper" circuit which acts to "clip" the sharp-edged pulsed signal waveform produced by the muting circuit 26, which has the effect of intensifying the acoustic energy by compressing the sharp corners of the pulses in the waveform. This reshaping of the signal waveform allows the amplifier 30 to operate more efficiently.

Finally, the amplified signal is passed to a speaker 32, which emits the BBS. Ideally, the speaker 32 is designed to be waterproof, dust-proof, shock-proof, and generally highly durable, so that it can perform optimally and over a long period when the alarm is fitted to a vehicle. The preferred position of the alarm is for it be mounted on the exterior of a vehicle, so the speaker needs to be generally resilient.

The combination of a zener diode, and use of amplification, bandwidth narrowing, and clipping results in an alarm which efficiently and effectively generates, processes and emits a good quality, audible, locatable sound from a few simple components, allowing a compact and inexpensive safety device to be simply produced.

The alarm circuit as indicated in block form in FIG. 2 can be implemented in a number of ways using basic electronic components. FIG. 3 shows one such implementation, with the parts of the circuit forming the voltage regulator 10, high voltage generator 18, signal generator 20, amplifier 22, band-pass filter 24, muting circuit 26, intermittent signal generator 28, second amplifier with clipper circuit 30 and speaker 32 indicated. However, the invention is not limited to this particular circuit arrangement. Other circuits having the same effect as that shown in FIG. 3 also fall within the scope of the present invention.

Figure 4:
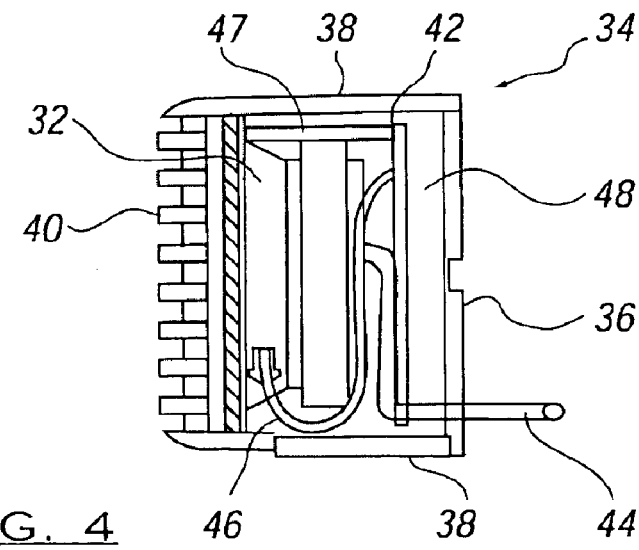
FIG. 4 shows a cross-section of a housing containing such an alarm.
Figure 5:
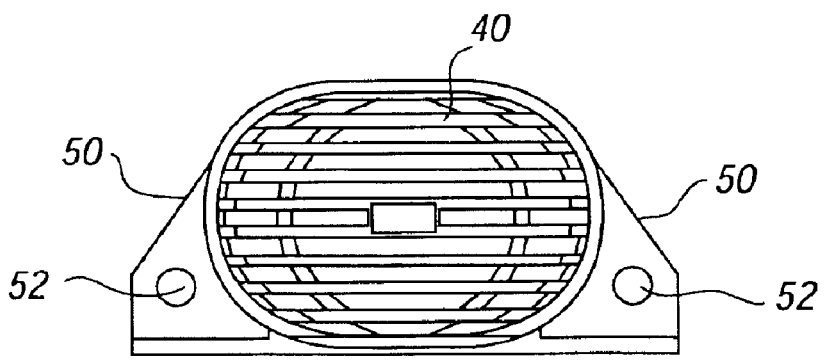
FIG. 5 shows a front view of the housing of FIG. 4.
Figure 6:
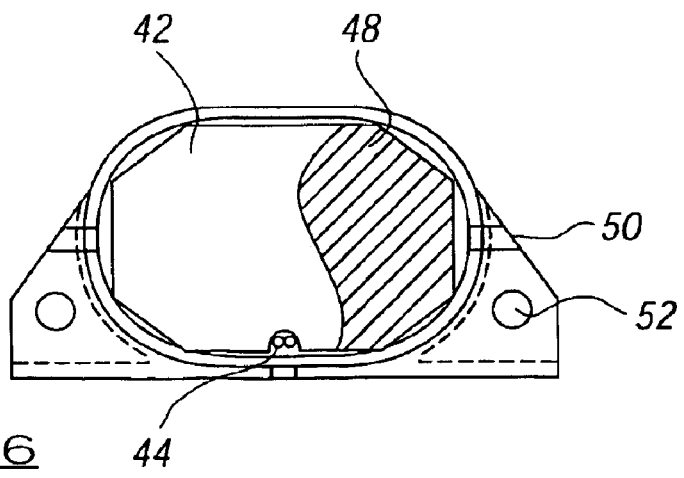
FIG. 6 shows a partially cut-away rear view of the housing of FIG. 4.

FIGS. 4 to 6 show an alarm mounted in a housing for use, in cross-section, in front view, and in partially cut-away rear view, respectively.

A housing 34 comprises a back wall 36, side walls 38 and a front wall 40. The housing may be made from a moulded plastics material. A printed circuit board 42 containing the electronic alarm circuit is mounted within the housing 34. The speaker 32 is mounted adjacent to the circuit board 42, also within the housing 34, so that the speaker cone is situated just behind the front wall 40. A power cable 44 connects the circuit board 42 and speaker 32 to a power source (for instance, a vehicle battery), and a speaker cable 46 connects the circuit board 42 to the speaker 32. A heat sink 47 is provided within the housing to absorb and dissipate heat produced by the circuit board 42 and the speaker 32. Epoxy resin 48 fills the remaining space within the housing from the back wall 36 to the front edge of the speaker cone. This holds the parts securely in place, and insulates them. The front wall 40 is formed in the shape of a perforated grill so that the BBS can be emitted from the housing 34. Flanges 50 extend from the side walls 38, and are provided with screw holes 52 to allow the housing 34 containing the alarm to be affixed to a vehicle exterior.

Advantageously, the alarm is automatically activated when the vehicle to which it is fitted is put into reverse gear. This can be simply achieved by connecting the alarm appropriately to the existing wiring of the vehicle (connections not shown). For example, the alarm could be electrically connected in series or parallel to an existing reversing light. Alternatively, a separate driver-operated switch could be provided for the alarm.

Alternative embodiments of the present invention are possible. For example, the alarm could be further provided with a light which is activated when the alarm is switched on, so that the alarm provides a visual warning signal in conjunction with an audible one, all contained in a single unit. Such a device could be designed as a plug-in module in which the electrical connections to the vehicle are in form of standard bulb contacts, so that the module combining light and sound alarms could be simply plugged into an existing reversing light bulb socket.

Also, the alarm could be modified to produce single tone sounds alternatively with the BBS bursts. Such sounds are useful for attracting attention to audible alarms as these kinds of sounds are associated with alarms and sirens due to common usage. The listener can then use the BBS to locate the source of the alarm sound.

What is claimed is:

1. A reversing alarm for a vehicle, said reversing alarm comprising:

a signal generating device, said signal generating device including a zener diode to generate a broad band sound signal.

2. A reversing alarm according to claim 1, in which the alarm further comprises bandwidth narrowing means for narrowing the bandwidth of the broad band sound signal before emission of the audible signal.

3. A reversing alarm for a vehicle according to claim 2 in which the bandwidth narrowing means comprises a band-pass filter.

4. A reversing alarm for a vehicle according to claim 1, in which the audible broad band sound signal is emitted in pulsed bursts.

5. A reversing alarm for a vehicle according to claim 4, comprising a muting circuit, driven by an intermittent signal generator, which acts to alternately block and pass the broad band sound signal to produce pulsed bursts of sound.

6. A reversing alarm for a vehicle according to claim 5, further comprising a clipper circuit which compresses and reshapes the corners of the pulsed signal.

7. A reversing alarm for a vehicle according to claim 4, in which the pulsed bursts of sound have a repetition frequency of substantially 1.5 Hz (90 pulses per minute).

8. A reversing alarm for a vehicle according to claim 1, which is powered by a standard 12 V DC or 24 V DC vehicle battery.

9. A reversing alarm for a vehicle according to claim 8, comprising a voltage regulator which acts to regulate the voltage from the battery before the voltage is applied to power the reversing alarm.

10. A reversing alarm for a vehicle according to claim 9, in which the voltage regulator produces a voltage of substantially 8 V DC.

11. A reversing alarm for a vehicle according to claim 1, and comprising a speaker from which the broad band sound is emitted.

12. A reversing alarm for a vehicle according to claim 11, in which the speaker is waterproof.

13. A reversing alarm for a vehicle according to claim 1, in which the components of the alarm are mounted within a housing adapted for mounting on the exterior of a vehicle.

14. A reversing alarm for a vehicle according to claim 1, and further comprising a light source which provides a visible alarm when the alarm is in use.

15. A reversing alarm for a vehicle according to claim 1, which, when fitted to a vehicle, is automatically activated when the vehicle is put into reverse.

* * * * *